United States Patent
Willenegger et al.

(10) Patent No.: US 6,775,254 B1
(45) Date of Patent: Aug. 10, 2004

(54) METHOD AND APPARATUS FOR MULTIPLEXING HIGH-SPEED PACKET DATA TRANSMISSION WITH VOICE/DATA TRANSMISSION

(75) Inventors: Serge Willenegger, Onnens (CH); Stein A. Lundby, Solana Beach, CA (US)

(73) Assignee: Qualcomm Incorporated, San Diego, CA (US)

( * ) Notice: Subject to any disclaimer, the term of this patent is extended or adjusted under 35 U.S.C. 154(b) by 516 days.

(21) Appl. No.: 09/711,121

(22) Filed: Nov. 9, 2000

(51) Int. Cl.[7] .............................................. H04Q 7/00
(52) U.S. Cl. ...................................... 370/329; 370/352
(58) Field of Search ......................... 370/310, 319–321, 370/329, 352–356, 335, 337, 342, 344, 347

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,331,641 A | * | 7/1994 | Parruck et al. ............. 370/102 |
| 6,064,662 A | | 5/2000 | Gitlin et al. ................ 370/330 |
| 6,526,036 B1 | * | 2/2003 | Uchida et al. .............. 370/342 |

FOREIGN PATENT DOCUMENTS

| EP | 0841763 | 5/1998 |
|---|---|---|
| EP | 0876008 | 11/1998 |

OTHER PUBLICATIONS

U.S. application No. 08/963,386, entitled "Method and Apparatus for High Rate Packet Data Transmission," filed Nov. 3, 1997, now pending. Paul E. Bender, Qualcomm Inc., San Diego, CA (USA).

3 GPP2 1 XTREME: Presentation Motorola and Nokia. LSI Logic, Mar. 26, 2000. (pp. 1–31).

$3^{GPP2.Pxxx}$: "Supplemental Specification for Support of Very High Rate Traffic in 3G Spread Spectrum System," $3^{rd}$ Generation Partnership Project 2, Mar. 26, 2000 (pp. 1–39).

Sunay, et al. "Provision of Variable Data Rates in Third Generation Wideband DS CDMA Systems" IEEE 505–509 (1999).

* cited by examiner

*Primary Examiner*—Wellington Chin
*Assistant Examiner*—Brenda Pham
(74) *Attorney, Agent, or Firm*—Philip Wadsworth; Thien T. Nguyen; Thomas R. Rouse (57) ABSTRACT

Techniques for transmitting voice/data and packet data services such that packet data transmissions have less impact on voice/data transmissions. In one aspect, voice/data and packet data can be multiplexed within a transmission interval such that the available resources are efficiently utilized. In another aspect, the amount of variation in the total transmit power from a base station is controlled to reduce degradation to transmissions from this and other base stations. In a specific method for concurrently transmitting a number of types of data, a first data type (e.g., voice, overhead, and some data) and a second data type are respectively processed in accordance with first and second signal processing schemes to generate first and second payloads, respectively. First and second partitions are then defined in a transmission interval. The first and second payloads are time multiplexed into the first and second partitions, respectively, and the multiplexed payloads are transmitted.

6 Claims, 8 Drawing Sheets

METHOD AND APPARATUS FOR MULTIPLEXING HIGH-SPEED PACKET DATA TRANSMISSION WITH VOICE/DATA TRANSMISSION

BACKGROUND OF THE INVENTION

I. Field of the Invention

The present invention relates to data communication. More particularly, the present invention relates to novel and improved techniques for multiplexing high-speed packet data transmission with conventional voice/data transmission in a wireless communication system.

II. Description of the Related Art

A modern day communication system is required to support a variety of applications. One such communication system is a code division multiple access (CDMA) system that supports voice and data communication between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM." A specific CDMA system is disclosed in U.S. patent application Ser. No. 08/963,386, entitled "METHOD AND APPARATUS FOR HIGH RATE PACKET DATA TRANSMISSION," filed Nov. 3, 1997 (the HDR system), now U.S. Pat. No. 6,574,211, issued Jun. 3, 2003. These patents and patent application are assigned to the assignee of the present invention and incorporated herein by reference.

CDMA systems are typically designed to conform to one or more standards. Such standards include the "TIA/EIA/IS-95-B Mobile Station-Base Station Compatibility Standard for Dual-Mode Wideband Spread Spectrum Cellular System" (the IS-95 standard), the "TIA/EIA/IS-98 Recommended Minimum Standard for Dual-Mode Wideband Spread Spectrum Cellular Mobile Station" (the IS-98 standard), the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), the "TR-45.5 Physical Layer Standard for cdma2000 Spread Spectrum Systems" (the cdma2000 standard), and the "TIA/EIA/IS-856 cdma2000 High Rate Packet Data Air Interface Specification" (the HDR standard). New CDMA standards are continually proposed and adopted for use. These CDMA standards are incorporated herein by reference.

Some CDMA systems are capable of supporting multiple types of service (e.g., voice, packet data, and so on) over the forward and reverse links. Each type of service is typically characterized by a particular set of requirements, some of which are described below.

Voice service typically requires a fixed and common grade of service (GOS) for all users as well as (relatively) stringent and fixed delays. For example, the overall one-way delay of speech frames may be specified to be less than 100 msec. These requirements may be satisfied by providing a fixed (and guaranteed) data rate for each user (e.g., via a dedicated channel assigned to the user for the duration of a communication session) and ensuring a maximum (tolerable) error rate for speech frames independent of the link resources. To maintain the required error rate at any given data rate, higher allocation of resources is required for a user having a degraded link.

In contrast, packet data service may be able to tolerate different GOS for different users and may further be able to tolerate variable amounts of delays. The GOS of a data service is typically defined as the total delay incurred in the error free transfer of a data message. The transmission delay can be a parameter used to optimize the efficiency of a data communication system.

To support both types of service, a CDMA system can be designed and operated to first allocate transmit power to voice users requiring a particular GOS and shorter delays. Any remaining available transmit power can then be allocated to packet data users whom can tolerate longer delays.

In the CDMA system, each transmission source acts as interference to other transmission sources. Because of the bursty nature of packet data, the transmit power from a transmission source can fluctuate widely during the transmission of data bursts. The rapid and wide fluctuation in the transmit power can interfere with other transmissions from other sources and can degrade the performance of these transmissions.

As can be seen, techniques that can be used to efficiently and effectively multiplex high-speed packet data transmissions with voice and other transmissions are highly desirable.

SUMMARY OF THE INVENTION

The present invention provides various techniques for supporting voice/data and high-speed packet data services concurrently and to minimize the impact of packet data service on voice/data service. In accordance with an aspect of the invention, voice/data and packet data can be multiplexed within a transmission interval (e.g., a slot) such that the available resources are efficiently utilized. In accordance with another aspect of the invention, the transmit power from a base station is controlled such that the amount of variation in the total transmit power is maintained within a particular range to reduce degradation to transmissions from this and other transmission sources (e.g., base stations).

A specific embodiment of the invention provides a method for concurrently transmitting a number of types of data in a wireless (e.g., CDMA) communication system. In accordance with the method, a first type of data (e.g., voice, overhead, low and medium rate data, delay sensitive data, signaling, and so on) is received and processed in accordance with a first signal processing scheme to generate a first payload. A second type of data (e.g., high-speed packet data) is also received and processed in accordance with a second signal processing scheme to generate a second payload. The first signal processing scheme can conform to, for example, the W-CDMA or cdma2000 standard, and the second signal processing scheme can implement, for example, the HDR design.

First and second partitions are then defined in a transmission interval, with the first partition being used to send the first type of data and the second partition being used to send the second type of data. The first and second payloads are then multiplexed onto the first and second partitions, respectively, and the multiplexed first and second payloads are transmitted. The capacity for the transmission interval can be selected to be greater than that required by the first payload (e.g., by using a shorter length channelization code)

The invention further provides other methods, transmitter units (e.g., base stations), receiver units (e.g., remote terminals), and other elements that implement various aspects, embodiments, and features of the invention, as described in further detail below.

BRIEF DESCRIPTION OF THE DRAWINGS

The features, nature, and advantages of the present invention will become more apparent from the detailed description set forth below when

DETAILED DESCRIPTION OF THE SPECIFIC EMBODIMENTS

Figure 1A:
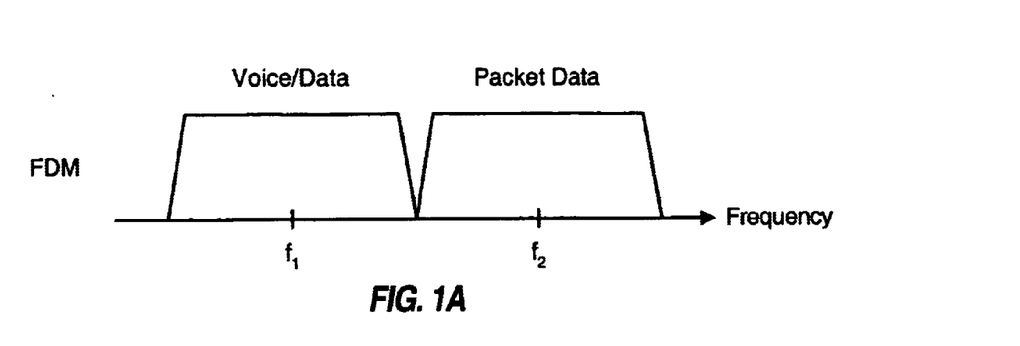
FIGS. 1A through 1C are diagrams respectively illustrating FDM, TDM, and CDM techniques to provide multiple types of service for a number of remote terminals in a wireless communication system.
Figure 1B:
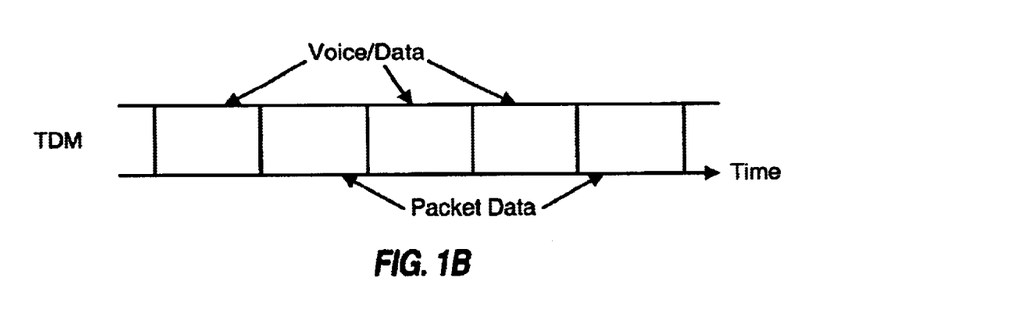
Figure 1C:
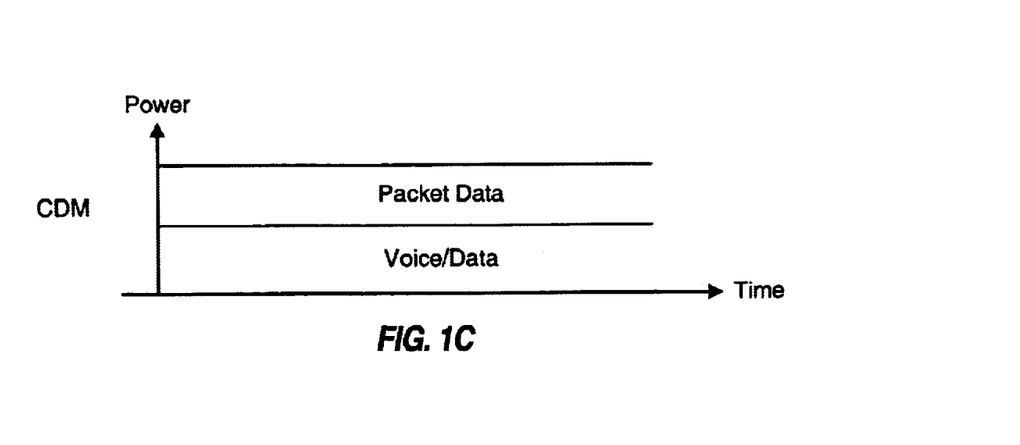

FIGS. 1A through 1C are diagrams illustrating three different techniques to provide multiple types of service for a number of remote terminals in a wireless communication system. Some of these different types of service may include, for example, voice, packet data, video, broadcast, messaging, and so on. Other overhead transmissions typically employed for a wireless communication system may include, for example, paging, pilot, control channel, and so on. For simplicity, high-speed packet data is referred to herein as simply "packet data," and remaining types of data (e.g., voice, overhead, certain types of medium and low rate data, delay sensitive data, and others) are collectively referred to as "voice/data." Optimization of packet data transmission is an important aspect of efficient spectrum utilization. However, minimizing the impact of packet data transmission on voice/data transmission is also important to maintain the desired level of service quality and reliability.

FIG. 1A shows a frequency division multiplex (FDM) system that supports voice/data and packet data services using two frequency bands, f1 and f2. As noted above, because of the differences in the characteristics and requirements of voice/data and packet data services, it is typically preferable to segregate these services. In the FDM system, voice/data service can be supported by a first system (e.g., an IS-95 system) with one carrier signal at a first frequency, and packet data service can be supported by a second system (e.g., an HDR system) with a second carrier signal at a second frequency.

FIG. 1B shows a time division multiplex (TDM) system in which transmissions occur over discrete time units, which may be referred to as "slots" in some systems or "frames" in some other systems. For the TDM system, a number of slots are allocated to support voice/data service and remaining slots are used to support packet data service. Once such TDM system is a Global System for Mobile Communications (GSM)+Generalized Packet Radio System (GPRS) system. GPRS provides GSM packet data service.

FIG. 1C shows a code division multiplex (CDM) system in which voice/data and packet data services share the available transmit power. For the CDM system, each voice/data transmission and each packet data transmission is typically channelized by a respective channelization code such that the transmissions are (ideally) orthogonal to each other. The transmit power for each transmission may be adjusted to maintain the desired level of performance. The number of transmissions that can be concurrently supported and the data rate of each transmission are dictated by the data loads, the available transmit power, and other factors.

Figure 2A:
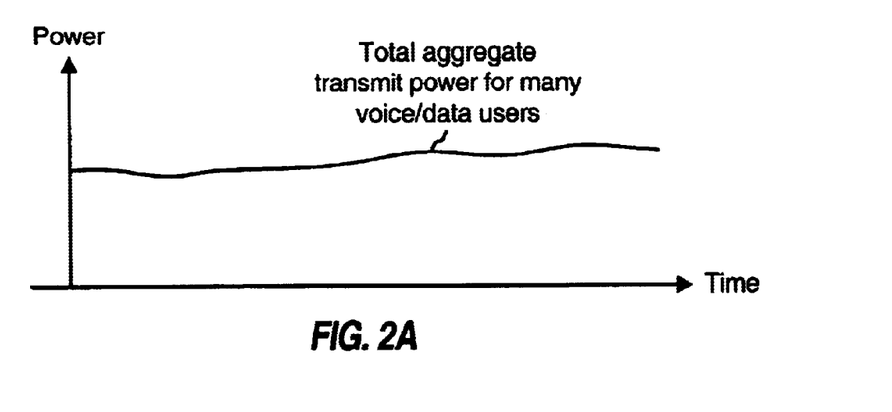
FIGS. 2A and 2B are plots of the transmit power from a base station in a CDM system for a number of voice/data users and for a number of voice/data and packet data users, respectively.

FIG. 2A is a plot of the transmit power from a base station in a CDM system that supports a number of voice/data users concurrently. For this CDM system, the transmit power to each individual user may vary widely due to changes in the data rate and path conditions. However, the total aggregate transmit power for all voice/data users typically varies over a smaller range (percentage wise) due to statistical averaging. Since each voice/data user typically requires only a medium to low data rate, a number of voice/data users can be supported concurrently. As the number of voice/data users increases, the statistical averaging improves and the amount of variation in the total aggregate transmit power decreases.

For a wireless communication system, the transmit power from each transmission source (e.g., each base station) acts as interference to other transmitting sources when they use the same radio resources. For the CDM system, the quality of the signal received by each user is dependent on the total noise and interference experienced by the signal received by the user. Thus, to maintain the desired signal quality, it is desirable that the interference remains as low as possible and as constant as possible (the system can generally compensate for progressive change in the interference but not for sudden changes).

Figure 2B:
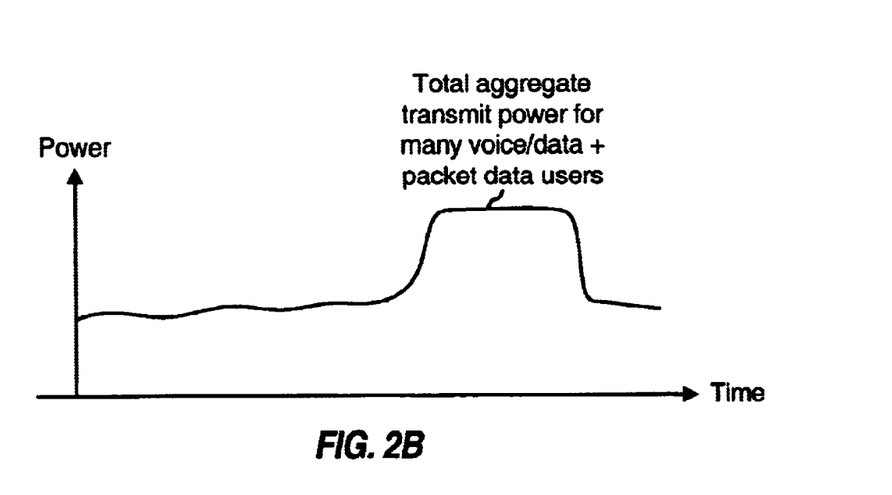

FIG. 2B is a plot of the transmit power from a base station in a CDM system that supports a number of voice/data and packet data users concurrently. Because of the bursty nature of packet data service and because of the high peak rate that can be used for packet data transmission, the total aggregate transmit power for voice/data and packet data users can vary over a much greater range over a shorter period of time than when transmitting to only voice/data users. This can be observed by comparing the plot in FIG. 2B with the plot in FIG. 2A. The larger variation in the total transmit power from the base station can cause a larger fluctuation in the signal quality of the transmissions from other base stations, which may result in performance degradation for these transmissions. Moreover, the larger variation in the total transmit power can also cause a larger fluctuation in the signal quality in the transmissions from this transmitting base station due to multipath and other phenomena.

The disclosed method and apparatus provide various techniques that can be used to support voice/data and packet data services concurrently and to minimize the impact of packet data service on voice/data service. In accordance with one embodiment, voice/data and packet data can be multiplexed within a transmission interval (e.g., a slot) such that the available resources are efficiently utilized. In accordance with another embodiment, the transmit power from a base station is controlled such that the amount of variation in the total transmit power is maintained within a particular range to reduce degradation to transmissions from this and other base stations.

In many CDM systems, data is transmitted over discrete transmission intervals. The duration of the transmission interval is typically defined to provide good performance for the service(s) being supported by the CDM system. For example, for the W-CDMA system, a transmission occurs over 10 msec radio frames, with each radio frame being further divided into 15 slots. The data to be transmitted is partitioned, processed, and transmitted in the defined transmission interval.

In accordance with one embodiment, a portion of the transmission interval (i.e., a voice/data partition) can be allocated for voice/data transmission and the remaining portion of the transmission interval (i.e., a packet data partition) can be used for high-speed packet data transmission. The voice/data and packet data partitions can be dynamically defined based on the voice/data load and the packet data load, and can be effectuated through proper signaling, as described in further detail below. The partitioning of the transmission interval into voice/data and packet data partitions can be achieved for various CDM systems such as, for example, the W-CDMA system, the cdma2000 system, and other systems. For a better understanding, the partitioning of the transmission interval is now specifically described for the downlink transmission in the W-CDMA system.

Figure 3:
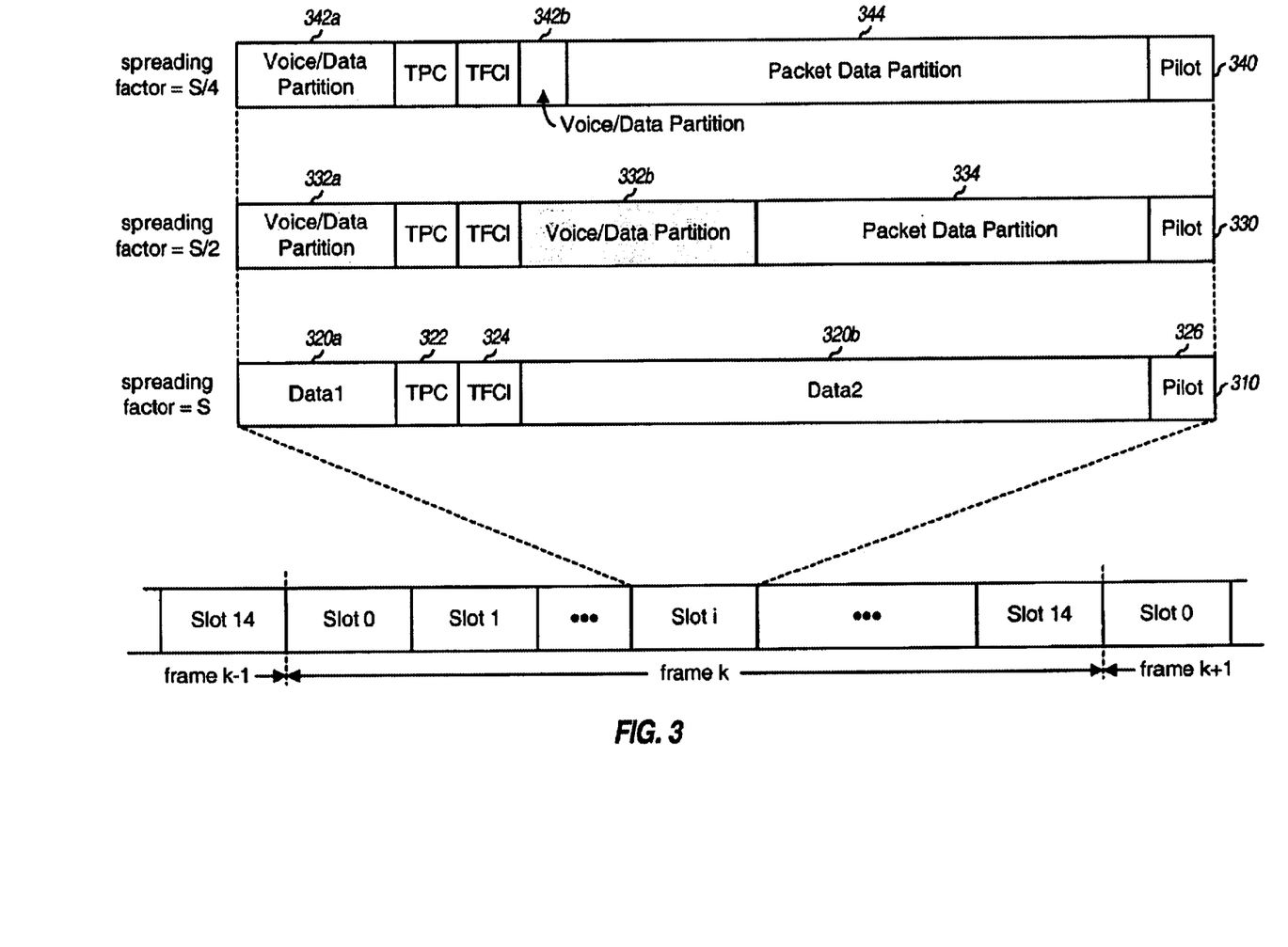
FIG. 3 is a diagram of a frame format and a slot format for a dedicated physical channel as defined by the W-CDMA standard.

FIG. 3 is a diagram of a frame format and a slot format for a dedicated physical channel as defined by the W-CDMA standard. A different frame format is defined by the W-CDMA standard for each type of physical channel such as the downlink dedicated channel (DPCH), the downlink shared channel (DSCH), and so on. The data to be transmitted on each physical channel (i.e., the traffic data) is partitioned into radio frames, with each radio frame covering a 10 msec time period and including 15 slots labeled as slot 0 through slot 14. Each slot is further partitioned into one or more fields used to carry a combination of traffic data, overhead data, and pilot data.

As shown in FIG. 3, for the dedicated physical channel, a slot 310 includes a first data (Data1) field 320a, a second data (Data2) field 320b, a transmit power control (TPC) field 322, a transport format combination indicator (TFCI) field 324, and a pilot field 326. Data fields 320a and 320b are used to send traffic data (e.g., voice, packet data, messaging, or others) for the dedicated physical channel. Transmit power control field 322 is used to send power control information to direct the remote terminal to adjust its transmit power on the uplink either up or down to achieve the desired level of performance while minimizing interference to other remote terminals. Transport format combination indicator field 324 is used to send information indicative of the format (e.g., the bit rate, channelization code, and so on) of the dedicated physical channel as well as of a shared physical channel associated with the dedicated physical channel. Pilot field 326 is used to send pilot data for the dedicated physical channel.

Table 1 lists some of the slot formats defined by the W-CDMA standard (version V3.1.1) for the dedicated physical channel. Each slot format in Table 1 defines the length (in number of bits) of each field in the slot. As shown in Table 1, the bit rate of the dedicated physical channel can vary over a large range of values (e.g., from 15 Kbps to 1920 Kbps) and the number of bits in each slot varies correspondingly. One or more fields in the slot may be omitted (i.e., length=0) for some of the slot formats.

TABLE 1

| Slot Format | Channel Bit Rate (Kbps) | Spreading Factor | Total Bits/Slot | $N_{Data1}$ | $N_{Data2}$ | $N_{TPC}$ | $N_{TFCI}$ | $N_{Pilot}$ |
|---|---|---|---|---|---|---|---|---|
| 0 | 15 | 512 | 10 | 0 | 4 | 2 | 0 | 4 |
| 1 | 15 | 512 | 10 | 0 | 2 | 2 | 2 | 4 |
| 2 | 30 | 256 | 20 | 2 | 14 | 2 | 0 | 2 |
| 3 | 30 | 256 | 20 | 2 | 12 | 2 | 2 | 2 |
| 4 | 30 | 256 | 20 | 2 | 12 | 2 | 0 | 4 |
| 5 | 30 | 256 | 20 | 2 | 10 | 2 | 2 | 4 |
| 6 | 30 | 256 | 20 | 2 | 8 | 2 | 0 | 8 |
| 7 | 30 | 256 | 20 | 2 | 6 | 2 | 2 | 8 |
| 8 | 60 | 128 | 40 | 6 | 28 | 2 | 0 | 4 |
| 9 | 60 | 128 | 40 | 6 | 26 | 2 | 2 | 4 |
| 10 | 60 | 128 | 40 | 6 | 24 | 2 | 0 | 8 |
| 11 | 60 | 128 | 40 | 6 | 22 | 2 | 2 | 8 |
| 12 | 120 | 64 | 80 | 12 | 48 | 4 | 8 | 8 |
| 13 | 240 | 32 | 160 | 28 | 112 | 4 | 8 | 8 |
| 14 | 480 | 16 | 320 | 56 | 232 | 8 | 8 | 16 |
| 15 | 960 | 8 | 640 | 120 | 488 | 8 | 8 | 16 |
| 16 | 1920 | 4 | 1280 | 248 | 992 | 6 | 16 | 16 |

In accordance with the W-CDMA standard, a number of physical channels can be used to send data to a particular remote terminal. Each physical channel is channelized with an orthogonal variable spreading factor (OVSF) code having a particular spreading factor (ranging from 4 to 512 for the downlink). The OVSF code channelizes the physical channel such that the transmission on this physical channel is orthogonal to other transmissions on other physical channels. The OVSF code is akin to the Walsh code used in the IS-95 system to channelize the forward link transmissions. The OVSF code for each physical channel is typically determined (by the network) at the start of a communication session and typically does not change during the session.

The spreading factor corresponds to the length of the OVSF code. A smaller spreading factor (e.g., 4) corresponds to a shorter code length and is used for a higher data rate, and a larger spreading factor (e.g., 512) corresponds to a longer code length and is used for a lower data rate. As shown in Table 1, the total number of bits per slot (and thus the total number of bits available for traffic data) varies over a wide range and is dependent on the spreading factor used for the slot.

In accordance with one embodiment, data fields 320a and 320b allocated for traffic data in each slot can be partitioned into a voice/data partition and a packet data partition. The voice/data partition can be used for the voice/data to be transmitted in the slot. The packet data partition can be used to transmit packet data.

For a particular voice/data transmission on the physical channel, the data bits for the transmission are segmented and processed, as described in further detail below. In accordance with the W-CDMA standard, the voice/data payload for each slot can include any number of data bits (i.e., does not need to be a specific number of bits). Also, the size of the voice/data payload can vary from slot to slot. Depending on the number of bits in the payload, the spreading factor of the OVSF code can be selected accordingly.

As shown in Table 1, the spreading factor for the OVSF code ranges from 4 to 512 and in powers of two. Each spreading factor and slot format is associated with a particular number of data bits that can be transmitted in a slot. The spreading factor can thus be used to (coarsely) select the capacity of the slot. Typically, for a given payload size, the largest possible spreading factor that approximately matches that payload size is selected.

The number of coded bits in the payload for a slot may not be equal to the number of available data bits for the selected spreading factor. The W-CDMA standard thus defines a rate-matching scheme whereby a number of coded bits in the payload can be punctured (i.e., deleted) or repeated such that the number of rate-matched bits is equal to the number of available bits in the slot.

Using the processing mechanism defined by the W-CDMA standard (e.g., the spreading), the capacity of a slot can be defined. A portion of the slot capacity can be used for voice/data and the remaining portion can be used for packet data. A "slot partition parameter" can be defined and used to identify the particular allocation (e.g., a percentage amount) of the available slot for packet data and voice/data. The slot partition parameter may denote full allocation of the slot for voice/data (e.g., slot partition parameter=0%), or full allocation of the slot for packet data (e.g., slot partition parameter=100%), or any possible percentage and mix in between those two extremes.

Table 2 lists the partitioning of a slot for voice/data and packet data for three different sets of spreading factors. For a given voice/data payload, the spreading factor can be selected such that the slot capacity approximately matches the payload. Depending on the particular payload size, different spreading factors may be required, as shown in the second column. If the spreading factor is then decreased by a factor of two, the slot capacity is approximately doubled, as shown in Table 1. In this case, half of the slot capacity can be allocated for the voice/data payload and the other half of the slot capacity can be used for packet data, as shown in the third column. Thus, if the spreading factor is decreased by a factor of two, approximately 50% of the slot capacity can be used for packet data (i.e., the slot partition parameter=50%).

Similarly, if the spreading factor is decreased by a factor of four, the slot capacity is approximately quadrupled. A quarter of the slot capacity can then be allocated for the voice/data payload and the other three-quarter of the slot capacity can be used for packet data, as shown in the fourth column. Thus, if the spreading factor is decreased by a factor of four, approximately 75% of the slot capacity can be used for packet data (i.e., the slot partition parameter=75%). The spreading factor can be further reduced to further increase the slot capacity and slot partition parameter.

TABLE 2

|  | Spreading Factor - Voice/Data Only | Spreading Factor - 50% of Capacity for Packet Data | Spreading Factor - 75% of Capacity for Packet Data |
| --- | --- | --- | --- |
| User 1 | 16 | 8 | 4 |
| User 2 | 32 | 16 | 8 |
| User 3 | 64 | 32 | 16 |
| User 4 | 128 | 64 | 32 |

As shown in Table 1, the spreading factor has lengths of powers of two and the slot capacity approximately doubles each time the spreading factor is reduced by a factor of two. This coarse increment in the spreading factor results in a correspondingly coarse increment in the slot partition parameter (e.g., 0%, 50%, 75%, and so on, up to 100%). Fine adjustment of the slot partition parameter can be achieved by use of the rate-matching mechanism defined by the W-CDMA system. With the rate-matching, the slot partition parameter may be defined to be any particular value (e.g., 20%, 30%, and so on). The voice/data payload can then be fitted into the voice/data partition by selecting the proper rate-matching parameters, as described in further detail below. The rate-matching can thus be used for fine adjustment of the slot partition parameter.

For each slot of each physical channel, the voice/data partition can be used for one user and the packet data partition can be used for the same or different user. The partitions can be mixed and matched among users.

FIG. 3 also shows the slot partitioning corresponding to two reduced spreading factors. In a slot 330, the spreading factor is reduced by a factor of two (from S down to S/2) and the slot capacity is approximately doubled. Data fields 320a and 320b are partitioned into voice/data partitions 332a and 332b and a packet data partition 334. Voice/data partition 332b comprises approximately half of the slot (i.e., the left half in the example shown in FIG. 3) and is used for voice/data. Packet data partition 334 comprises the remaining half of the slot and is used for packet data.

Similarly, in a slot 340, the spreading factor is reduced by a factor of four (from S down to S/4) and the slot capacity is approximately quadrupled. Data fields 320a and 320b are partitioned into voice/data 312 partitions 342a and 342b and a packet data partition 344. Voice/data partition 342b comprises approximately a quarter of the slot and is used for voice/data. Packet data partition 344 comprises the remaining three-quarter of the slot and is used for packet data. Other spreading factors can also be used to provide different slot capacity and to provide different percentage allocation between voice/data and packet data (i.e., different slot partition parameter).

As shown in Table 1, when the spreading factor is reduced by a particular factor (e.g., two), a different slot format is used. Since the new slot format is typically associated with a different number of overhead bits, the payload capacity of the new slot is approximately (and may not be exactly) increased by the particular factor. The partitioning of the slot into a voice/data partition and a packet data partition can be achieved in various manners.

In a first partitioning embodiment, the slot partition parameter is selected based on the voice/data load and the packet data load. For example, if the voice/data load is approximately equal to the packet data load, the spreading factor can be selected to be half of the value that would have been selected for just the voice/data load. Approximately half of the slot capacity is then allocated for voice/data and the other half for packet data. The voice/data and packet data can each be processed based on the selected slot partition parameter, as described in further detail below.

In a second partitioning embodiment, the voice/data payload is processed first and mapped to the available space in the slot. Any remaining part of the slot not used for voice/data can then be used to multiplex packet data. In this embodiment, the slot partition parameter is determined after the processing of the voice/data payload and based on the remaining available space in the slot. To ensure that some space is available for packet data, a smaller spreading factor can be selected.

For the W-CDMA system, the rate-matching processing can be operated such that a particular number of coded bits can be generated for the voice/data payload to match the number of bit positions available in the voice/data partition. If the payload is larger than the voice/data partition, a number of coded bits can be punctured (i.e., deleted).

Alternatively, if the payload is smaller than the voice/data partition, a number of coded bits can be repeated.

A similar rate-matching can also be performed on the packet data to match the payload to the available space in the packet data partition. Alternatively, the packet data payload can be formed to match the packet data partition. Other techniques to map the packet data payload to the packet data partition can also be contemplated and are within the scope of the invention.

In an embodiment, for a particular base station, all channels for voice/data can be defined to have the same partition length (which does not necessarily correspond to the same payload since the processing for the channels may be different). This supports the use of a completely different transmission structure (e.g., similar to that of the HDR system) in the packet data partition.

The partitioning of a slot and the transmission of both voice/data and packet data within the slot may provide numerous advantages. First, the voice/data and packet data can be decoupled. This decoupling may be achieved, for example, by minimizing the overlap between the two partitions. The decoupling of voice/data and packet data can minimize the impact of packet data on voice/data and can improve performance for both types of service. Second, the slot partitions support transmission of both voice/data and packet data on the same carrier. This allows a CDM system to provide multiple types of service to users. Third, the slot partitions can support multiple (and independent) channel structures for voice/data and packet data, as described in further detail below. Each channel structure can be specifically designed for the particular type of service being supported by that channel (e.g., different coding and interleaving schemes). Also, some CDM systems such as the W-CDMA system can be adapted (possible with a small number of changes to the existing design) to support the slot partitions of the invention.

Figure 4:
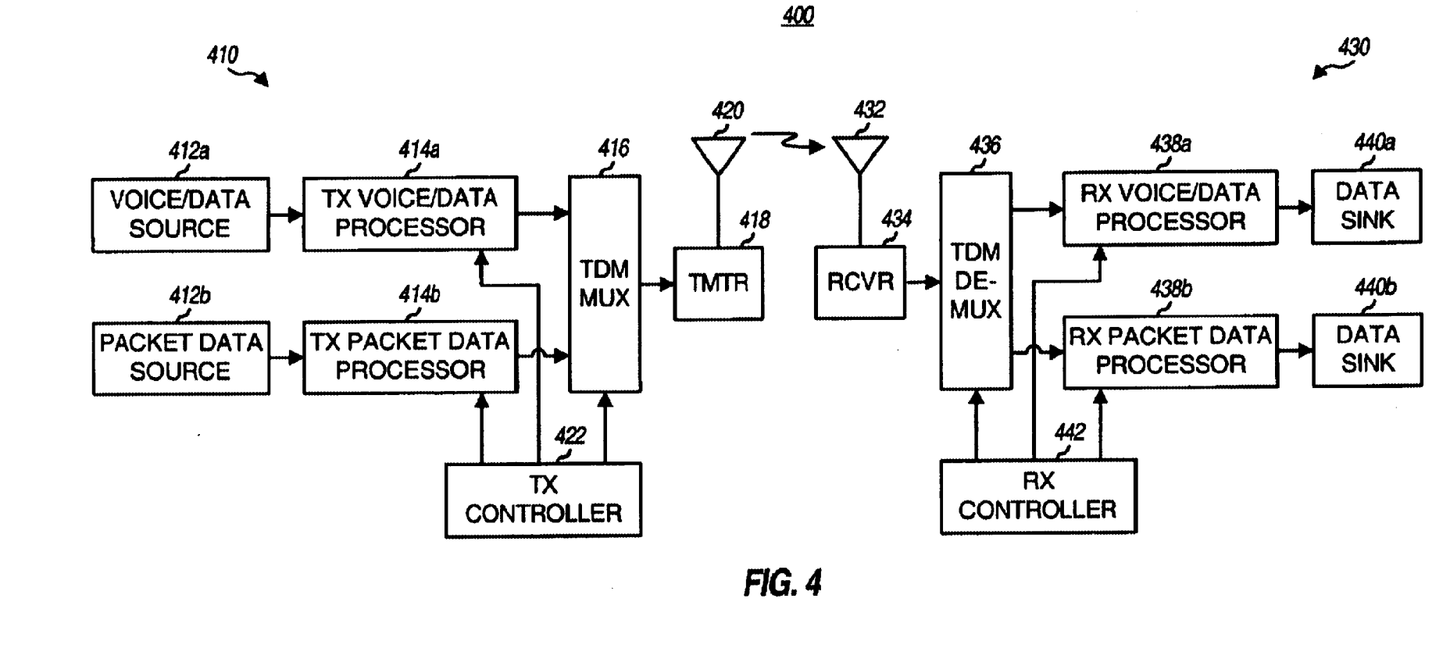
FIG. 4 is a simplified block diagram of a communication system that can implement various aspects of the invention.

FIG. 4 is a simplified block diagram of a communication system 400 that can implement various aspects of the invention. In a specific embodiment, communication system 400 is a CDMA (based) system that conforms to the W-CDMA standard, the cdma2000 standard, or some other standard or CDMA (based) design. At a transmitter unit 410 (e.g., a base station), voice/data is sent, typically in blocks, from a voice/data source 412a to a transmit (TX) voice/data processor 414a that formats, codes, and processes the data to generate coded voice/data. Similarly, packet data is sent, typically in packets, from a packet data source 412b to a transmit packet data processor 414b that formats, codes, and processes the data to generate coded packet data.

The coded voice/data and packet data are then provided to a TDM multiplexer 416 that multiplexes the data into one TDM data stream. The TDM multiplexed data can have the format shown in FIG. 3, and is provided to a transmitter (TMTR) 418 that (digitally and analog-wise) filters, (quadrature) modulates, amplifies, and upconverts the data to generate a modulated signal. The modulated signal is then transmitted via one or more antennas 420 (only one antenna is shown in FIG. 4) to one or more receiver units (e.g., remote terminals).

The processing performed by voice/data processor 414a and packet data processor 414b is dependent on the particular CDMA standard being implemented. The processing for the W-CDMA standard is described in further detail below. A transmit controller 422 can direct the operation of voice/data processor 414a and packet data processor 414b to provide the desired output data. Controller 422 can further direct the operation of TDM multiplexer 416 such that the desired TDM data stream is obtained.

At a receiver unit 430, the transmitted signal is received by one or more antennas 432 (again, only one antenna is shown in FIG. 4) and provided to a receiver (RCVR) 434. Within receiver 434, the received signal(s) are amplified, filtered, downconverted, (quadrature) demodulated, and digitized to generate samples. The samples may be processed, e.g., digitally filtered, scaled, and so on to generate symbols. A TDM demultiplexer (DEMUX) 436 receives and demultiplexes the symbols and provides the voice/data symbols to a receive (RX) voice/data processor 438a and the packet data symbols to a receive packet data processor 438b. Each data processor 438a and 438b processes and decodes the respective received symbols in a manner complementary to the processing and coding performed at transmitter unit 410. The decoded data from data processors 438a and 438b is then provided to respective data sinks 440a and 440b.

A receive controller 442 can direct the operation of TDM demultiplexer 436 such that the data symbols are properly demultiplexed and routed to the proper receive data processor. Controller 442 can further direct the operation of receive data processors 438a and 438b to properly process and decode the data symbols.

The slot partitions, slot partition parameter, and signal processing parameters (collectively, the processing information) can be signaled by the transmission source (e.g., base station) to the receiving device (e.g., remote terminal) based on various signaling schemes. In one embodiment, the processing information can be sent by the base station to the remote terminal (1) on a control channel (e.g., the common control physical channel (CCPCH) in the W-CDMA system), (2) in the transmission itself (e.g., in a control data field in the slot), or via some other mechanism. In another embodiment, some of the processing information can be provided to the remote terminal during the session initialization stage. The remote terminal then stores the information for later use.

The signal processing described above supports transmissions of various types of service. A bidirectional communication system supports two-way data transmission. However, the signal processing for the reverse direction is not shown in FIG. 4 for simplicity. However, it should be noted that the reverse link transmission could be common to both partitions or could be partitioned as well.

The voice/data and packet data can be processed in various manners. In one processing embodiment, the voice/data and packet data are processed by two (independent) processing paths that can implement two different processing schemes. Various signal processing schemes can be used such as, for example, CDMA, TDMA, and so on. Each processing path can take into account the current slot partitioning parameter and process the voice/data or packet data payload such that it can be mapped into the allocated space in the slot. As shown in FIG. 4, the two signal processing schemes for voice/data and packet data can be supported by two data processors 414a and 414b at transmitter unit 410 and data processors 438a and 438b at receiver unit 430.

The signal processing scheme for each processing path may be selected specifically for the data type being transmitted by that path. For voice/data, the signal processing defined by a particular CDMA standard (e.g., W-CDMA, cdma2000, or IS-95 standard) or some other CDMA (based) design may be used. For packet data, the signal processing defined by the same of a different CDMA standard or some other design (e.g., HDR) may be used. The HDR design is well suited for packet data and may provide improved performance over other CDMA signal processing schemes. The voice/data and packet data can thus be segmented, coded, rate-matched, and interleaved based on their respective signal processing schemes.

Although not shown explicitly in FIG. 4, the voice/data and packet data can be modulated using the same or two different modulation schemes. The modulation schemes that may be used include, for example, phase shift keying (PSK) such as quadrature PSK (QPSK) or offset-QPSK (OQPSK), quadrature amplitude modulation (QAM), orthogonal frequency division multiplexing (OFDM), and others.

In an alternative processing embodiment, the voice/data and packet data are processed based on a common signal processing scheme, which can be defined by a particular CDMA standard (e.g., W-CDMA or cdma2000 standard) or some other CDMA (based) design. However, different sets of parameters may be used for voice/data and packet data. For example, the block length and interleaving interval for packet data may be selected to be longer than for voice/data. Also, different coding schemes may be used for voice/data and packet data. For example, voice/data may be coded using convolutional coding and packet data may be coded using Turbo coding. These different processing schemes are supported by some newer generation CDMA standards such as the W-CDMA and cdma2000 standards. The use of a common signal processing scheme may simplify the designs of the transmitter unit and receiver unit.

In an embodiment, the voice/data and packet data are time division multiplexed together into a slot after the signal processing, as shown in FIG. 4. The temporal order in which the voice/data and packet data appear at the output of TDM multiplexer 416 is approximately the temporal order in which the data is transmitted over-the-air. TDM multiplexing the voice/data and packet data after the signal processing allows for decoupling of these two data types, as described in further detail below.

In an alternative embodiment, the voice/data and packet data are time division multiplexed together into a slot prior to the signal processing. The TDM voice/data and packet data are then processed (e.g., based on a common signal processing scheme). Although the voice/data and packet data may be mixed in this embodiment, various techniques can be used to minimize the impact of packet data on voice/data. For example, for a particular base station, all channels for voice/data can be defined to have the same partition length. Additional techniques to minimize the impact of packet data on voice/data are described in further detail below.

Improved performance may be attained if the packet data partitions for neighboring base stations (or cells) are approximately aligned in time. By minimizing the amount of overlap between the voice/data transmissions and packet data transmissions (to the extent possible), the amount of interference between the two types of transmission may be reduced, which may improve the performance of both types of transmission. Alignment of the partitions may reduce the impact of the burstiness and high data rate of packet data transmissions on voice/data transmissions.

Time alignment of the packet data partitions in neighboring cells can be achieved by first synchronizing the timing of the cells using, for example, timing from Global Position System (GPS) satellites. The slot partition parameter may be selected to be approximately the same (e.g., 50%) for a given cell cluster. The slot can then be partitioned such that the packet data partitions for the cells in the cluster overlap as much as possible. Also, changes in the slot partition parameter may be restricted to a particular range. Signaling between the (neighboring) base stations can be used to align the packet data partitions.

If the packet data loads for neighboring cells are different, the slot partitions can still be defined such that the packet data partitions overlap as much as possible. However, for cells with lighter packet data loads, some of the slots may be defined with no packet data partition (i.e., slot partition parameter=0%). If the voice/data partitions and packet data partitions overlap for a particular base station or a group of neighboring base stations, the transmit power for the voice/data partitions or the packet data partitions, or both, can be adjusted to reduce the impact from the overlap. For example, the transmit power for the voice/data partitions can be increased, the transmit power for the packet data partitions can be decreased or limited to some particular values (e.g., approximately equal to that of the voice/data partitions in the same slot, as described below), or a combination thereof.

To also reduce the amount of overlap between the voice/data and packet data partitions, a "guard time" can be provided between the voice/data partition and the packet data partition. The guard time can be a gap of a particular time duration in which no data of any type is transmitted.

In an embodiment, to support different signal processing schemes and to be backward compatible with other (e.g., older generation) CDMA systems, the transmissions on some (physical) channels can be time division multiplexed to concurrently support voice/data and packet data, and the transmissions on some other channels can be operated to support voice/data only (or possibly packet data only). When overlaying the system of the invention over legacy systems, it is typically not possible to align all the partitions of all downlink channels since some of the legacy systems do not support partitioning of a channel. In such cases, the packet data channel structure can be designed to be consistent (e.g., orthogonal) with the legacy channel structure in order to minimize interferences between channels.

In accordance with another embodiment, to reduce the impact of packet data transmissions on voice/data transmissions, particularly when the two types of transmission overlap, the transmit power for packet data transmissions is adjusted to reduce the amount of fluctuation in the total aggregate transmit power from the base station. As shown in FIG. 2B, the burstiness and high data rate of packet data transmission can cause a large fluctuation in the total aggregate transmit power from the base station, which may then cause a large fluctuation in the amount of interference to other transmissions from this and other base stations. The fluctuation in the total aggregate transmit power can be reduced based on various schemes.

Figure 5:
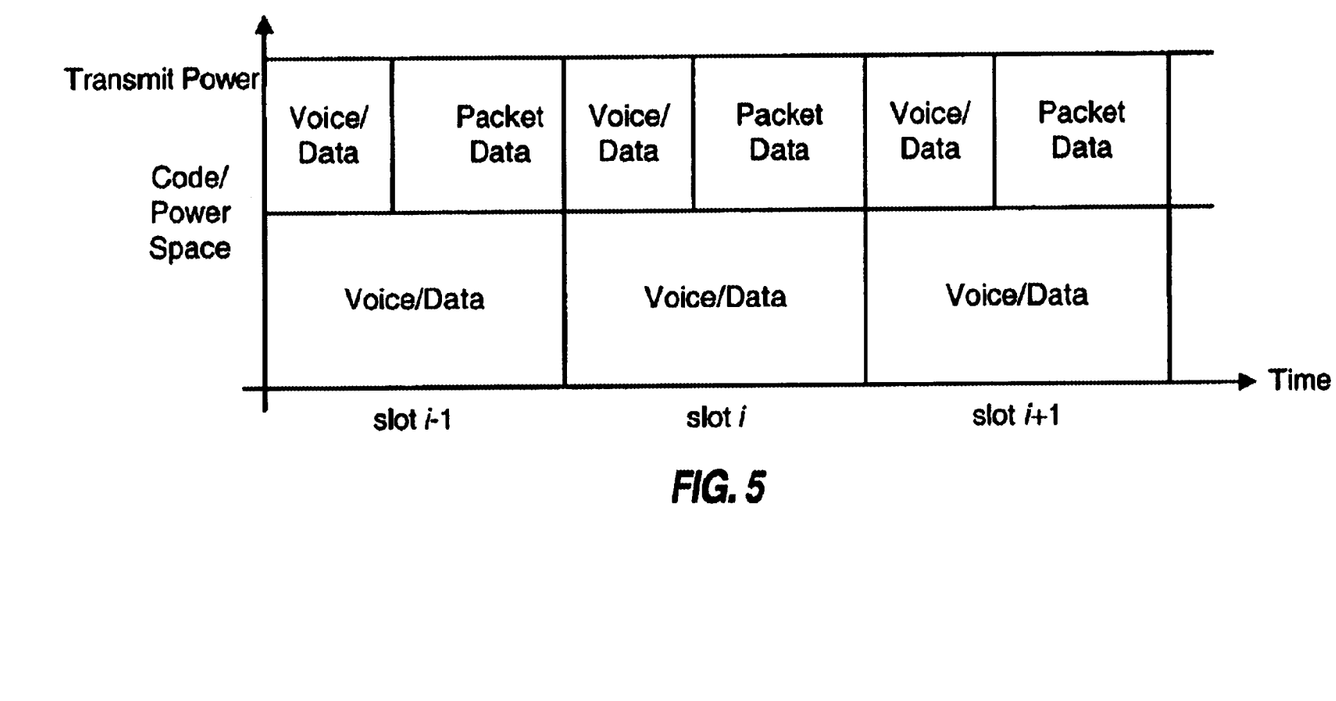
FIG. 5 is a plot of the transmit power for a number of voice/data transmissions and a number of packet data transmissions from a particular base station.

FIG. 5 is a plot of the transmit power for a number of voice/data transmissions and a number of packet data transmissions from a particular base station. For each slot, the transmit power for all voice/data-only transmissions can be summed and the total aggregate voice/data transmit power can be plotted as shown in FIG. 5. For mixed voice/data and packet data transmissions, the transmit power for all voice/data partitions can be summed, and the transmit power for all packet data partitions can also be summed. The total aggregate transmit power for the packet data partitions can be maintained to be approximately equal to the total aggregate transmit power for the voice/data partitions, as shown in FIG. 5.

The "equalization" of the transmit power for voice/data and packet data can be achieved at the "per transmission" level or "per base station" level. At the per transmission level, the transmit power for the packet data partition of each mixed transmission (e.g., to a particular remote terminal) is maintained to be approximately equal to the transmit power for the voice/data partition. This ensures that the total aggregate transmit power for the two partitions for a number of transmissions to a number of remote terminals will be approximately equal. Equalization at the per transmission level may be simpler to implement than at the per base station level.

At the per base station level, the transmit power for the packet data partition of each mixed transmission is allowed to vary from the transmit power for the voice/data partition. However, the total aggregate transmit power from the base station for the two partitions is maintained to be approximately equal. A controller within the base station allocates the transmit power for the packet data partition for each mixed transmission such that equalization of the aggregate transmit power is achieved.

Figure 6A:
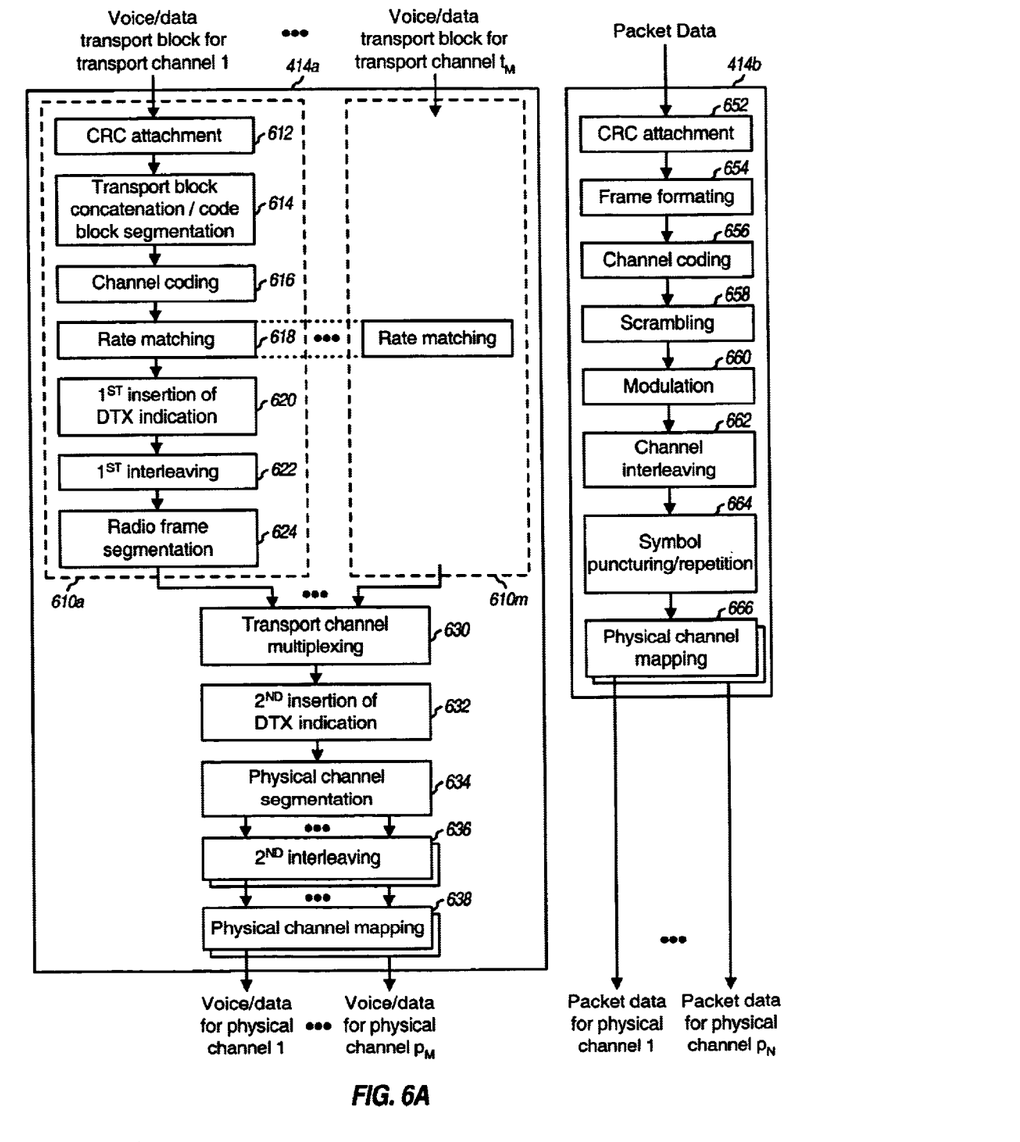
FIGS. 6A and 6B are block diagrams showing the signal processing at a transmitter unit for a downlink voice/data transmission in accordance with the W-CDMA standard and a packet data transmission in accordance with the HDR design.
Figure 6B:
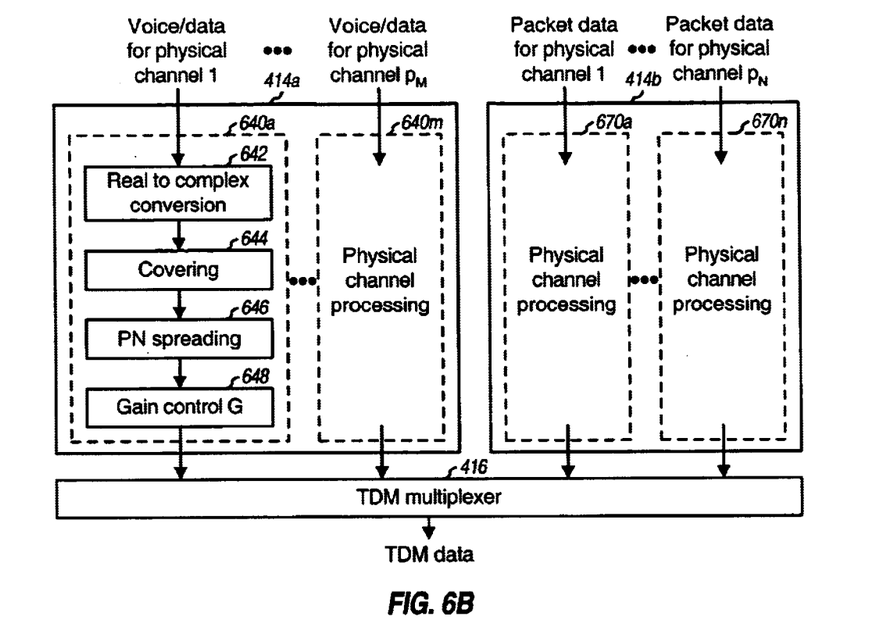

FIGS. 6A and 6B are diagrams of the signal processing at transmitter unit 410 for a downlink voice/data transmission in accordance with the W-CDMA standard and a downlink packet data transmission in accordance with the HDR design. The downlink refers to transmission from a base station to a remote terminal (or user equipment (UE), the terminology used in the W-CDMA standard), and the uplink refers to transmission from the remote terminal to the base station.

The signal processing for voice/data is performed by voice/data processor 414*a* shown in FIG. 4. The upper signaling layers of the W-CDMA system support concurrent transmission of a number of transport channels, with each transport channel capable of carrying voice/data (e.g., voice, video, data, and so on) for a particular communication. The voice/data for each transport channel is provided, in blocks that are also referred to as transport blocks, to respective transport channel processing sections 610*a*–610*m*.

Within each transport channel processing sections 610*a*–610*m*, each transport block is used to calculate cyclic redundancy check (CRC) bits, in block 612. The CRC bits are attached to the transport block and used at the receiver unit for error detection. A number of CRC coded blocks are then serially concatenated together, in block 614. If the total number of bits after concatenation is greater than the maximum size of a code block, the bits are segmented into a number of (equal-sized) code blocks. Each code block is then coded with a particular coding scheme (e.g., a convolutional code, a Turbo code) or not coded at all, in block 616.

Rate matching is then performed on the code bits, in block 618. Rate matching is performed based on a rate-matching attribute assigned by higher signaling layers. In accordance with one embodiment, the rate-matching is further performed based on the slot partition parameter that defines the voice/data partition for each slot.

For the rate-matching on the uplink, bits are repeated or punctured such that the number of bits to be transmitted for each voice/data payload matches the number of bits available in the allocated voice/data partition. On the downlink, in accordance with the W-CDMA standard, unused bit positions can be filled with discontinuous transmission (DTX) bits, in block 620. The DTX bits indicate when a transmission should be turned off and are not actually transmitted. In accordance with one embodiment, the unused bit positions can be advantageously assigned to the packet data partition and used for packet data transmission.

The rate-matched bits are then interleaved in accordance with a particular interleaving scheme to provide time diversity, in block 622. In accordance with the W-CDMA standard, the time interval over which interleaving is performed can be selected from a set of possible time intervals (i.e., 10 msec, 20 msec, 40 msec, or 80 msec). The interleaving time interval is also referred to as a transmission time interval (TTI). The TTI is an attribute associated with each transport channel and, in accordance with the W-CDMA standard, typically does not change for the duration of a communication session. As used herein, a "traffic" comprises the bits within one TTI for a particular transport channel.

When the selected TTI is longer than 10 msec, the traffic is segmented and mapped onto consecutive transport channel radio frames, in block 624. Each transport channel radio frame corresponds to a transmission over a (10 msec) radio frame period. In accordance with the W-CDMA standard, a traffic may be interleaved over 1, 2, 4, or 8 radio frame periods.

The radio frames from all active transport channel processing sections sections 610*a*–610*m* are then serially multiplexed onto a coded composite transport channel (CCTrCH), in block 630. DTX bits may then be inserted in the multiplexed radio frames such that the number of bits to be transmitted matches the number of bits available on the physical channel(s) used for the data transmission, in block 632. Again, in accordance with one embodiment, the DTX bit positions can be advantageously used for packet data transmission. If more than one physical channel is used, the bits are segmented among the physical channels, in block 634. Each physical channel can carry transport channels having different TTIs. The bits in each radio frame period for each physical channel are then interleaved to provide additional time diversity, in block 636. The interleaved physical channel radio frames are then mapped to their respective physical channels, in block 638.

FIG. 6A also shows the signal processing at transmitter unit 410 for a downlink packet data transmission in accordance with the HDR design. Within data processor 414*b*, each data packet is used to calculate CRC bits, in block 652. The CRC bits are attached to the packet and used at the receiver unit for error detection. The CRC bits, data bits, and other control bits (if any) are then formatted, in block 654. The formatted packet is then coded with a particular coding scheme (e.g., a convolutional code, a Turbo code), in block 656. The code bits are then scrambled with a scrambling sequence assigned to the remote terminal designated to receive the packet data transmission, in block 658.

The scrambled bits are next modulated in accordance with a particular modulation scheme, in block 660. Various modulation schemes can be used (e.g., PSK, QPSK, and QAM) with the selected scheme being dependent, for example, on the data rate of the transmission. The modulation symbols are then interleaved, in block 662. Symbols may then be punctured or repeated, in block 664, to obtain the desired number of symbols. The symbol puncturing/repetition can also be performed based on the slot partition FIG. 6B is a diagram of the signal processing for the physical channels. As shown in FIG. 6B, the voice/data for each physical channel is provided to respective physical channel processing sections 640*a*–640*m* within data processor 414*a*. Within each physical channel processing section 640, the data is converted to complex notation (i.e.,inphase and quadrature components), in block 642. The complex data for each physical channel is then channelized (i.e., covered) with a respective channelization code (e.g., an OVSF code), in block 644, and then spread with pseudo-noise (PN) spreading codes, in block 646. The spread data may be scaled, in block 648, to adjust the transmit power of the voice/data transmission.

The processing for the packet data for each physical channel is performed by respective physical channel processing sections 670a–670n, which typically also perform covering, spreading, and scaling. The processed data from all active physical channel processing sections 640a–640m and 670a–670n are then provided to TDM multiplexer 416. TDM multiplexer 416 time division multiplexes the received data into the proper partitions in the slot. The subsequent signal processing to generate a modulated signal suitable for transmission to the remote terminal is known in the art and not described herein.

Figure 7A:
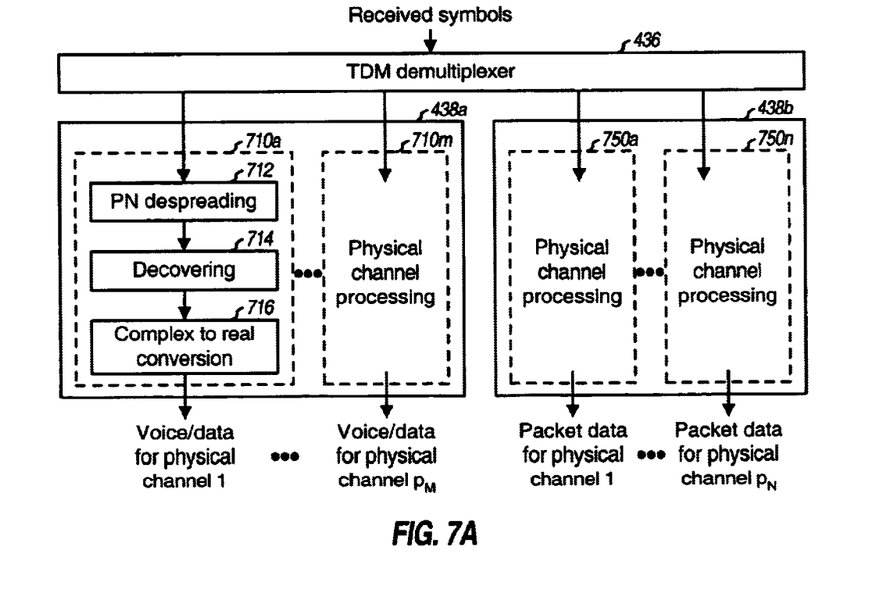
FIGS. 7A and 7B are block diagrams showing the signal processing at a receiver unit for the downlink voice/data transmission in accordance with the W-CDMA standard and the packet data transmission in accordance with the HDR design.
Figure 7B:
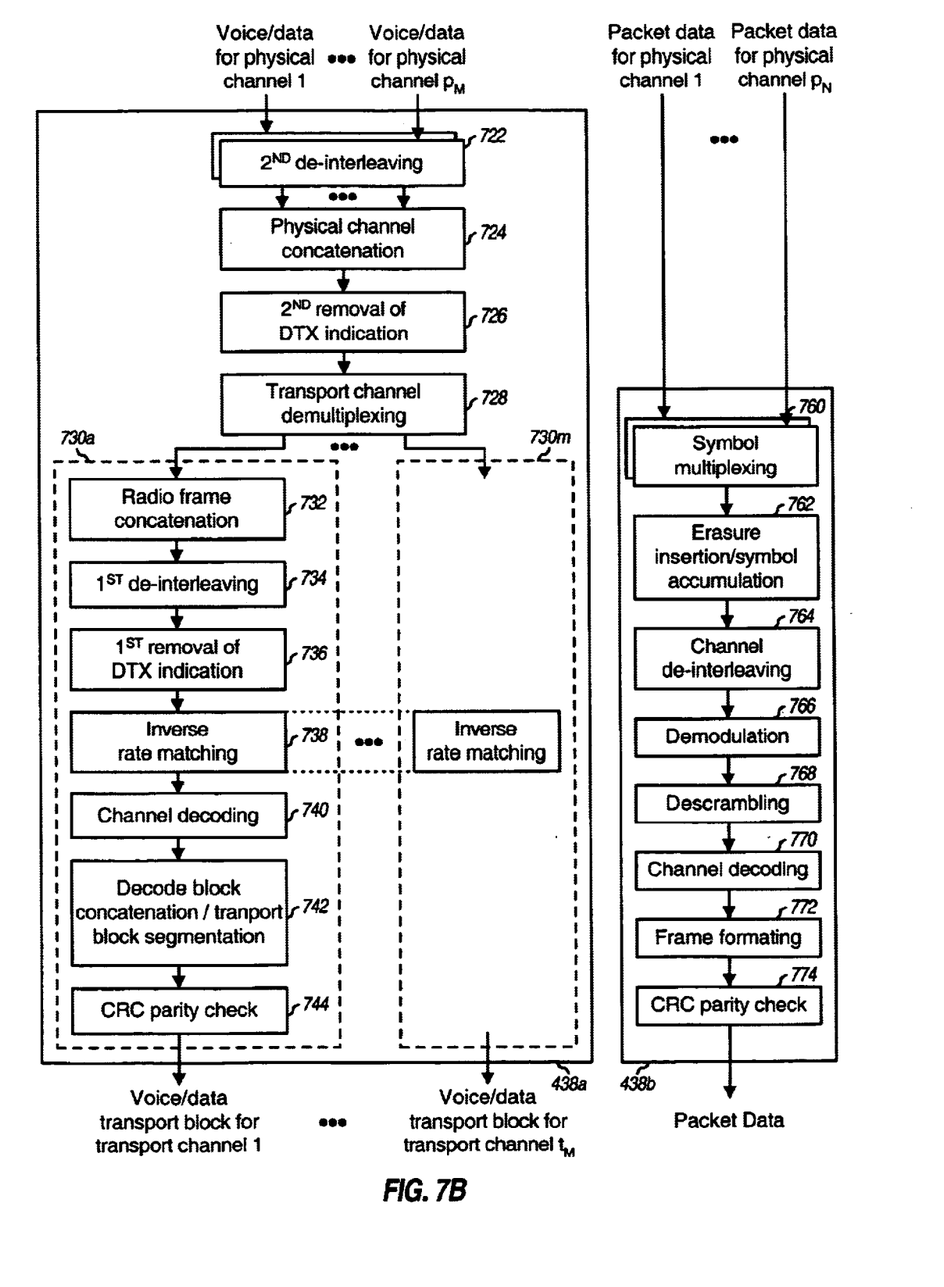

FIGS. 7A and 7B are diagrams of the signal processing at receiver unit 430 for a downlink voice/data transmission in accordance with the W-CDMA standard and a downlink packet data transmission in accordance with the HDR design. The signal processing shown in FIGS. 7A and 7B is complementary to that shown in FIGS. 6A and 6B. Initially, the modulated signal is received, conditioned, digitized, and processed to provide symbols for each physical channel used for the transmission. Each symbol has a particular resolution (e.g., 4-bit) and corresponds to a transmitted bit. The symbols are provided to TDM demultiplexer 436, which provides the voice/data symbols to data processor 438a and the packet data symbols to data processor 438b.

FIG. 7A shows the signal processing for the physical channels. The voice/data and packet data transmitted on each physical channel can be recovered by despreading and decovering the received symbols with the proper despreading and decovering codes. As shown in FIG. 7A, the voice/data symbols are provided to a number of physical channel processing sections 710a–710m. Within each physical channel processing section 710, the symbols are despread with the same PN spreading codes used at the transmitter unit, in block 712, decovered with the proper channelization code, in block 714, and converted to real symbols, in block 716. The output from each physical channel processing section 710a–710m comprises the coded voice/data transmitted on that physical channel. The processing for packet data can be achieved in similar manner by physical channel processing sections 750a–750n.

FIG. 7B shows the processing at receiver unit 430 for a voice/data transmission on the physical channels in accordance with the W-CDMA standard. Within data processor 438a, the symbols in each radio frame period for each physical channel are de-interleaved, in block 722, and the de-interleaved symbols from all physical channels used for the transmission are concatenated, in block 724. For a downlink transmission, non-transmitted bits (if any) are detected and removed, in block 726. The symbols are then demultiplexed into various transport channels, in block 728. The radio frames for each transport channel are then provided to a respective transport channel processing section 730 sections 730a–730m.

Within each of the transport channel processing sections 730a–730m, the transport channel radio frames are concatenated into traffics, in block 732. Each traffic includes one or more transport channel radio frames and corresponds to a particular TTI used for the transmission. The symbols within each traffic are de-interleaved, in block 734, and non-transmitted symbols (if any) are removed, in block 736. Inverse rate matching is then performed to accumulate repeated symbols and insert indication for punctured symbols, in block 738. Each coded block in the traffic is then decoded, in block 740 and the decoded blocks are concatenated and segmented into their respective transport blocks, in block 742. Each transport block is then checked for error using the CRC bits in block 744.

FIG. 7B also shows the signal processing at receiver unit 430 for a downlink packet data transmission in accordance with the HDR design. Within data processor 438b, the symbols from a number of physical channels may be multiplexed together, in block 760. Erasures are then inserted for punctured bits and repeated symbols are accumulated, in block 762. The rate-matched symbols are de-interleaved in block 764, demodulated in block 766, descrambled in block 768, and decoded in block 770. The de-interleaving, demodulation, descrambling, and decoding are performed complementary to the processing performed at the transmitter unit. The decoded data may be formatted, in block 772, and the decoded data packet is checked for error using the CRC bits, in block 774.

The voice/data and packet data partitions for a particular transmission can be used for a single user or can be used for two different users. To receive both partitions in the transmission, the processing sections shown in FIGS. 7A and 7B can be used. If a remote terminal is only receiving the voice/data partition in the transmission, only the TDM demultiplexer and voice/data processor are needed. Similarly, if a remote terminal is only receiving the packet data partition in the transmission, only the TDM demultiplexer and packet data processor are needed.

For clarity, various aspects of the invention have been described for two types of data, i.e., high-speed packet data and voice/data. The invention can be adapted to accommodate more than two types of data. Each type of data can be supported by a respective partition in the slot.

Also for clarity, various aspects of the invention have been described for a CDMA system that conforms to the W-CDMA standard. The invention may also be adapted for used in other CDMA (based) systems that conform to other CDMA standards such as, for example, the cdma2000 standard or to some other CDMA (based) designs.

The elements of transmitter unit 410 and receiver unit 430 can be implemented in various manners. For example, each data processor and controller shown in FIG. 4 can be implemented with one or more application specific integrated circuits (ASICs), digital signal processors (DSPs), programmable logic devices (PLDs), controllers, microcontrollers, microprocessors, other electronic units designed to perform the functions described herein, or a combination thereof. Also, an ASIC or DSP can be designed to implement multiple elements (e.g., a combination of data processors 414a and 414b and controller 422) within transmitter unit 410 or multiple elements (e.g., a combination of data processors 438a and 438b and controller 442) within receiver unit 430.

Various aspects and embodiments of the invention can be implemented in hardware, software, or a combination thereof. For example, the signal processing described above in FIGS. 6A through 7B can be performed by software executed on a processor. For a software implementation, the source code can be stored in a memory unit and executed by a processor. The partitioning of the transmission interval into multiple partitions can also be implemented by dedicated hardware, software executed on a processor, or a combination thereof.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for concurrently transmitting a plurality of types of data in a wireless communication system, the method comprising:

receiving and processing a first type of data in accordance with a first signal processing scheme to generate a first payload;

receiving and processing a second type of data in accordance with a second signal processing scheme to generate a second payload;

defining a first partition in a transmission interval to be used for transmitting the first type of data and a second partition in the transmission interval to be used for transmitting the second type of data;

selecting a particular capacity for the transmission interval exceeding that required by the first payload via a channelization code with a shorter length, wherein the first and second partitions are defined based in part on the selected capacity;

multiplexing the first and second payloads into the first and second partitions, respectively; and transmitting the multiplexed first and second payloads.

2. A method for concurrently transmitting a plurality of types of data in a wireless communication system, the method comprising:

receiving and processing a first type of data in accordance with a first signal processing scheme to generate a first payload;

receiving and processing a second type of data in accordance with a second signal processing scheme to generate a second payload;

defining a first partition in a transmission interval to be used for transmitting the first type of data and a second partition in the transmission interval to be used for transmitting the second type of data;

multiplexing the first and second payloads into the first and second partitions, respectively; and transmitting the multiplexed first and second payloads, wherein the second partitions for neighboring transmitting sources are defined to be approximately aligned in time.

3. A method for concurrently transmitting a plurality of types of data in a wireless communication system, the method comprising:

receiving and processing a first type of data in accordance with a first signal processing scheme to generate a first payload;

receiving and processing a second type of data in accordance with a second signal processing scheme to generate a second payload;

defining a first partition in a transmission interval to be used for transmitting the first type of data and a second partition in the transmission interval to be used for transmitting the second type of data;

multiplexing the first and second payloads into the first and second partitions, respectively; and transmitting the multiplexed first and second payloads, wherein the second partitions for neighboring transmitting sources are defined such that the second partitions overlap time-wise.

4. A method for concurrently transmitting a plurality of types of data in a wireless communication system, the method comprising:

receiving and processing a first type of data in accordance with a first signal processing scheme to generate a first payload;

receiving and processing a second type of data in accordance with a second signal processing scheme to generate a second payload;

defining a first partition in a transmission interval to be used for transmitting the first type of data and a second partition in the transmission interval to be used for transmitting the second type of data;

multiplexing the first and second payloads into the first and second partitions, respectively; and transmitting the multiplexed first and second payloads, wherein transmit power for the second partition is maintained to be approximately equal to or less than transmit power for the first partition.

5. A transmitter unit in a communication system operative to transmit a plurality of types of data, the transmitter unit comprising:

a first data processor operative to receive and process a first type of data in accordance with a first signal processing scheme to generate a first payload;

a second data processor operative to receive and process a second type of data in accordance with a second signal processing scheme to generate a second payload;

a multiplexer coupled to the first and second data processors and operative to multiplex the first and second payloads into first and second partitions, respectively, wherein the first partition is defined within a transmission interval and used to transmit the first type of data, wherein the second partition is further defined within the transmission interval and used to transmit the second type of data, wherein the capacity of the transmission interval is determined based in part on a length of a channelization code used for the first type of data; and a transmitter coupled to the multiplexer and operative to process and transmit the multiplexed first and second payloads.

6. The transmitter unit of claim 5, wherein the first type of data comprises voice data and the second type of data comprises high-speed packet data.

* * * * *